United States Patent
McKenzie

(10) Patent No.: US 10,102,224 B2
(45) Date of Patent: Oct. 16, 2018

(54) INTERACTIVE MUSIC FEEDBACK SYSTEM

(71) Applicant: Trent R. McKenzie, Austin, TX (US)

(72) Inventor: Trent R. McKenzie, Austin, TX (US)

(73) Assignee: Trent R. McKenzie, Austin, TX (US)

( * ) Notice: Subject to any disclaimer, the term of this patent is extended or adjusted under 35 U.S.C. 154(b) by 755 days.

(21) Appl. No.: 14/261,764

(22) Filed: Apr. 25, 2014

(65) Prior Publication Data

US 2014/0324885 A1 Oct. 30, 2014

Related U.S. Application Data

(60) Provisional application No. 61/815,965, filed on Apr. 25, 2013.

(51) Int. Cl.
*G06F 17/30* (2006.01)

(52) U.S. Cl.
CPC .. *G06F 17/30268* (2013.01); *G06F 17/30752* (2013.01); *G06F 17/30991* (2013.01); *G06F 17/30997* (2013.01)

(58) Field of Classification Search
CPC .... G06F 3/048; G06F 3/0481; G06F 3/04817; G06F 3/0484; G06F 3/04842; G06F 3/04847; G06Q 30/02; G06Q 30/0203; G06Q 30/0217
See application file for complete search history.

(56) References Cited

U.S. PATENT DOCUMENTS

| | | | | |
|---|---|---|---|---|
| 6,963,848 B1 * | 11/2005 | Brinkerhoff | ....... | G06Q 10/0639 705/14.19 |
| 7,301,944 B1 * | 11/2007 | Redmond | ......... | H04L 29/06027 370/390 |
| 8,918,312 B1 * | 12/2014 | Rehling | .............. | G06F 17/2785 704/9 |
| 2002/0032776 A1 * | 3/2002 | Hasegawa | .............. | G06Q 10/10 709/225 |
| 2003/0014262 A1 * | 1/2003 | Kim | ........................ | A63F 13/06 704/278 |
| 2004/0049534 A1 * | 3/2004 | Nickerson | ........... | G06F 17/3089 709/203 |
| 2005/0125444 A1 * | 6/2005 | Grigorian | ......... | G06F 17/30595 |
| 2006/0212444 A1 * | 9/2006 | Handman | ......... | G06F 17/30017 |
| 2008/0082394 A1 * | 4/2008 | Floyd | ................ | G06F 17/30943 705/7.32 |
| 2008/0109415 A1 * | 5/2008 | Yabe | .................. | G06F 17/30017 |
| 2010/0191689 A1 * | 7/2010 | Cortes | ............... | G06F 17/30784 706/46 |
| 2014/0099973 A1 * | 4/2014 | Cecchini | ................. | H04W 4/02 455/456.3 |

OTHER PUBLICATIONS

M. Wilkening, "Top 10 Drum Songs," published May 31, 2011 as indicated in the waybackmachine.org, downloaded from http://ultimateclassicrock.com/top-drum-songs/.*

* cited by examiner

*Primary Examiner* — Jennifer N To
*Assistant Examiner* — Eric J Yoon

(57) ABSTRACT

Embodiments of the invention are directed to apparatuses, methods, and computer program products for generating a rating score based on color. In some embodiments, the apparatuses, methods, and computer program products are configured to: receive at least one input, wherein the at least one input comprises at least one of a first numerical value, an emoticon, a color, or at least one keyword; process the at least one input; and generate a second numerical value based on processing the at least one input.

18 Claims, 8 Drawing Sheets

US 10,102,224 B2

INTERACTIVE MUSIC FEEDBACK SYSTEM

CROSS REFERENCES TO OTHER RELATED APPLICATIONS

This application claims priority from and is a non-provisional patent application of U.S. Provisional Patent Application No. 61/815,965, filed on Apr. 25, 2013, and entitled "COLOR-BASED RATING SYSTEM," the contents of which are hereby incorporated by reference in their entirety.

BACKGROUND

When producing an original work of art, an artist often collects feedback from an audience to better understand opinions and emotions felt by the audience when experiencing the work of art. The artist may choose to rely on audience feedback when making creative decisions so that the direction of the work of art more closely aligns with audience demands. Therefore, there is a need for a tool that enables an artist to quickly and efficiently collect feedback from an audience during production of a work of art to ultimately improve the direction of a work of art.

BRIEF SUMMARY

The present invention is directed to a software-based tool that enables a first user to quickly and efficiently solicit feedback from a second user. The feedback, provided by the second user to the first user, includes a variety of input types and is provided in response to various prompts configured by the first user (e.g., rating criteria, overall opinion, or the like). The present invention then processes the received inputs and generates a rating score based on the received inputs. Benefits of the present invention include saving the first user (e.g., an artist, a musician, or the like) ample amounts of time and money during the production process of a work of art (e.g., a video, audio, an image, text, or a physical product). Furthermore, the first user receives detailed information regarding exactly how the second user (e.g., an audience member, or the like), what he or she likes and dislikes, or the like. Therefore, the present invention enables the first user to make cost- and time-effective improvements to the work of art being produced based on opinionated information from the second user, thus potentially increasing the quality of the work of art being produced.

In some embodiments, an apparatus is provided. The apparatus comprises: a memory; a processor; and a module stored in memory, executable by the processor, and configured to: receive at least one input, wherein the at least one input comprises at least one of a first numerical value, an emoticon, a color, or at least one keyword; process the at least one input; and generate a second numerical value based on processing the at least one input.

In some embodiments, the at least one input is inputted via an interface that includes at least one input means, wherein the at least one input means includes at least one of a button, a slider, a text field, a selection menu, a color wheel, a color palette, a sensor, or a biometric reading.

In some embodiments, the interface is integrated with a third party content-providing platform.

In some embodiments, the module is configured to determine a third numerical value associated with the received emoticon, wherein determining the third numerical value comprises: comparing the received emoticon to one or more emoticons in a database to determine a match, wherein the one or more emoticons in the database are associated with the third numerical value, wherein the one or more emoticons in the database are associated with at least one of a positive emotion, a negative emotion, or a neutral emotion; identifying the third numerical value based on determining at least a partial match between the received emoticon and one or more emoticons in the database; and assigning the third numerical value to the received emoticon.

In some embodiments, the module is configured to determine a fourth numerical value associated with the at least one received keyword, wherein determining the fourth numerical value comprises: comparing the at least one received keyword to one or more keywords in a database to determine a match, wherein the one or more keywords in the database are associated with the fourth numerical value, wherein the one or more keywords in the database are associated with at least one of a positive emotion, a negative emotion, or a neutral emotion; identifying the fourth numerical value based on determining at least a partial match between the at least one received keyword and one or more keywords in the database; and assigning the fourth numerical value to the at least one received keyword.

In some embodiments, the received color is associated with a fifth numerical value, wherein the fifth numerical value is associated with at least one of a red value, a green value, a blue value, a cyan value, a black value, a magenta value, a yellow value, a hexadecimal value, a hue, a brightness, or a contrast.

In some embodiments, processing the at least one input includes weighting the at least one input.

In some embodiments, generating the second numerical value comprises assigning the second numerical value to a work of art, wherein the work of art is at least one of a video, audio, an image, text, or a product.

In some embodiments, a user is enabled to configure a scale associated with the at least one input means.

In some embodiments, the at least one input is inputted by at least one user in response to experiencing the work of art and is associated with an opinion of the work of art.

In some embodiments, the at least one input is associated with at least one rating criterion, wherein the at least one rating criterion is associated with one or more aspects of the work of art.

In some embodiments, generating the second numerical value comprises generating a graph of the second numerical value versus time, wherein the time is a duration of time associated with the work of art.

In some embodiments, the module is configured to receive information associated with the at least one user, wherein information associated with the at least one user includes at least one of location information, contact information, personal information, account information, user preferences, a user history, or demographic information.

In some embodiments, generating the second numerical value comprises generating a report based on the at least one received input, wherein the report includes at least one of the first numerical value, the emoticon, the at least one keyword, the color, an average color, an average emoticon, the second numerical value, an average overall numerical value associated with the at least one rating criterion, a time and date associated with the at least one input, or a total number of at least one of plays, views, listens, or inputs received.

In some embodiments, the at least one rating criterion is at least one of selected, added, deleted, modified, created, configured, or customized by the at least one user.

In some embodiments, processing the at least one input includes determining an optimal route of travel based on at least one of the second numerical value or the received information associated with the at least one user.

In some embodiments, processing the at least one input includes determining a next work of art for the at least one user to experience based on at least one of the second numerical value or the received information associated with the at least one user.

In some embodiments, the report is generated and displayed substantially simultaneously to generating the second numerical value.

In some embodiments, a method is provided. The method comprises: receiving, using a computing device processor, at least one input, wherein the at least one input comprises at least one of a first numerical value, an emoticon, a color, or at least one keyword; processing, using a computing device processor, the at least one input; and generating, using a computing device processor, a second numerical value based on processing the at least one input.

In some embodiments, a computer program product is provided. The computer program product comprises a non-transitory computer-readable medium comprising code causing an apparatus to: receive at least one input, wherein the at least one input comprises at least one of a first numerical value, an emoticon, a color, or at least one keyword; process the at least one input; and generate a second numerical value based on processing the at least one input.

BRIEF DESCRIPTION OF THE DRAWINGS

Figure 1:
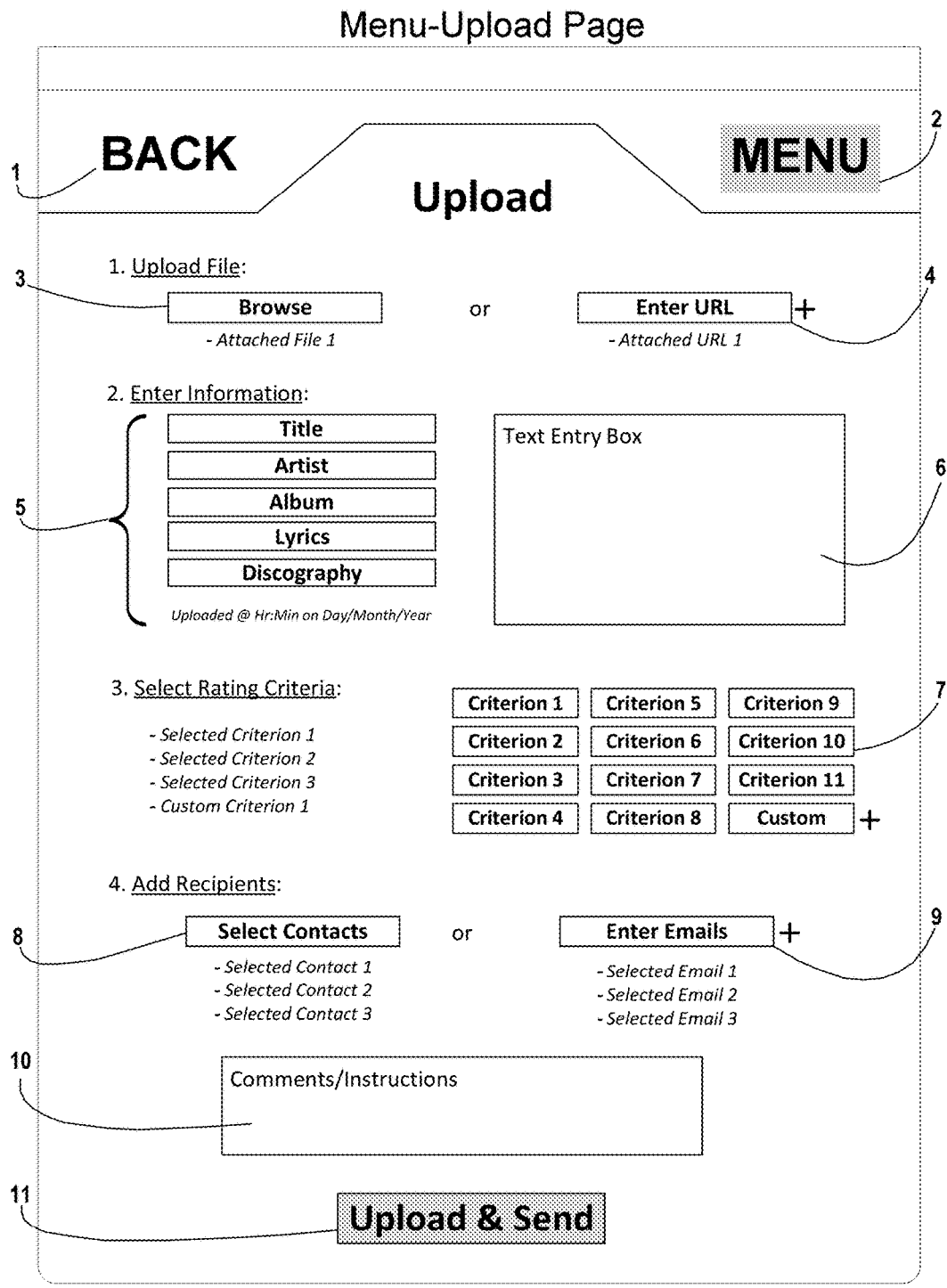
Figure 2:
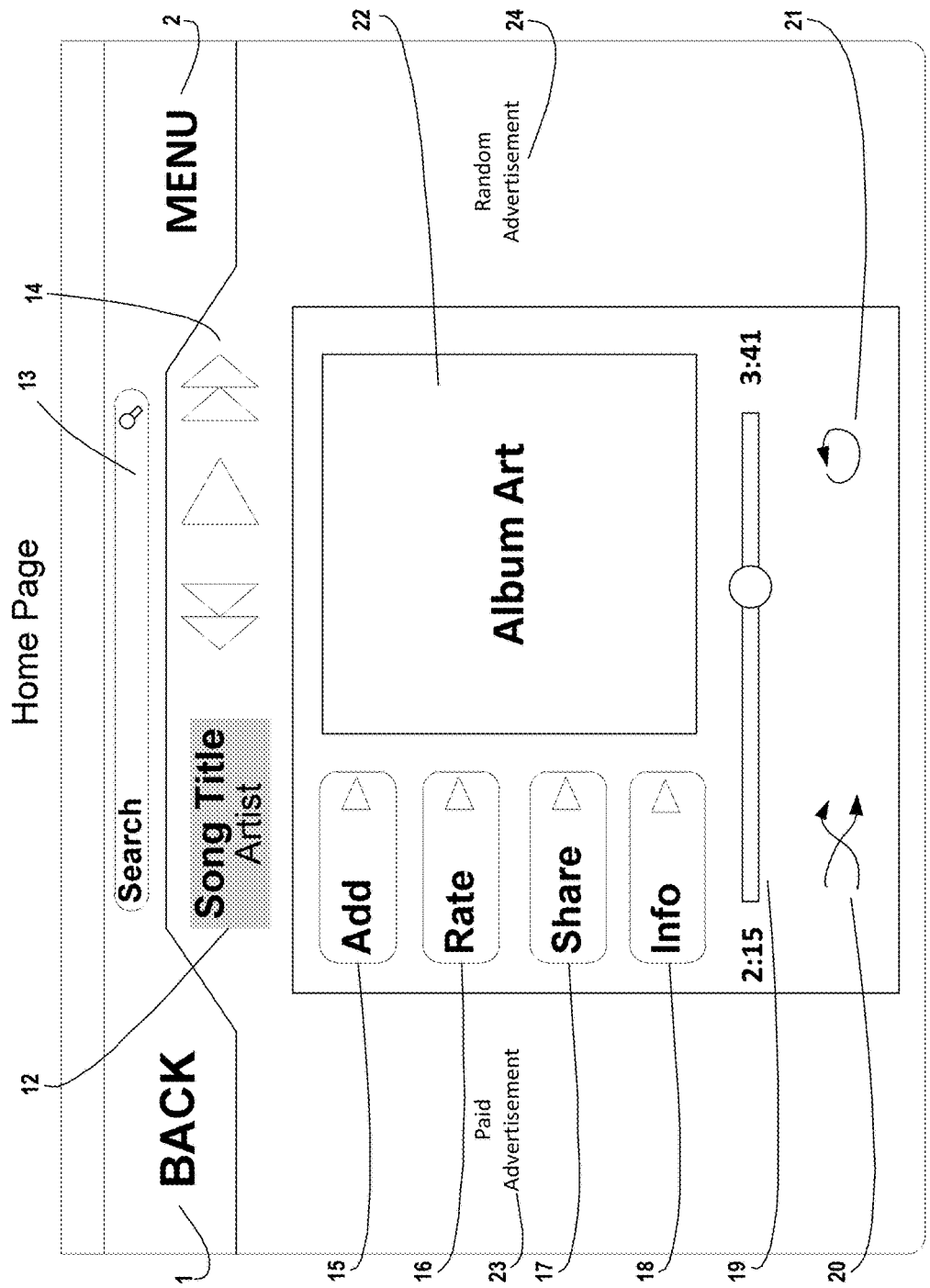
Figure 3:
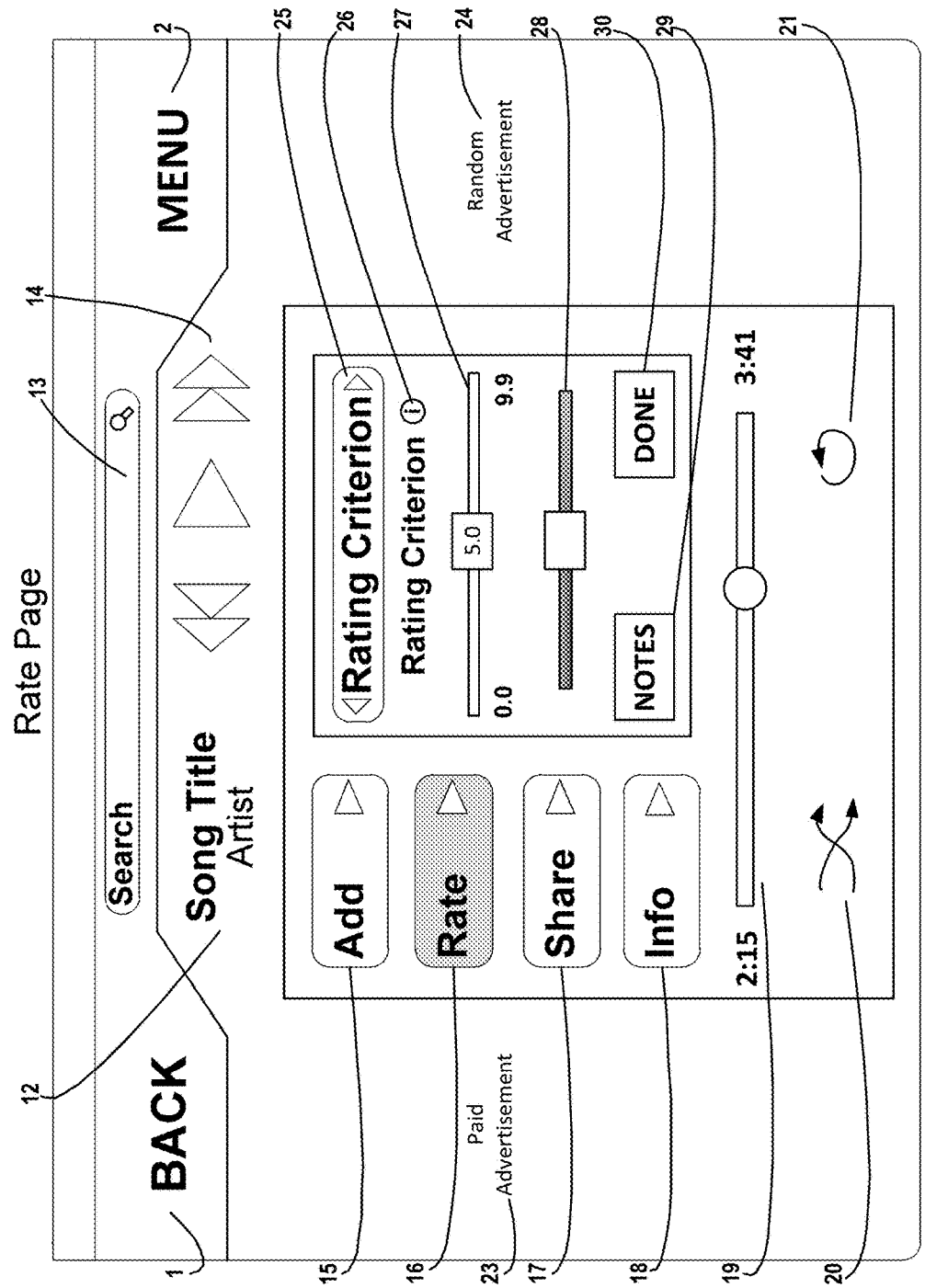
Figure 4:
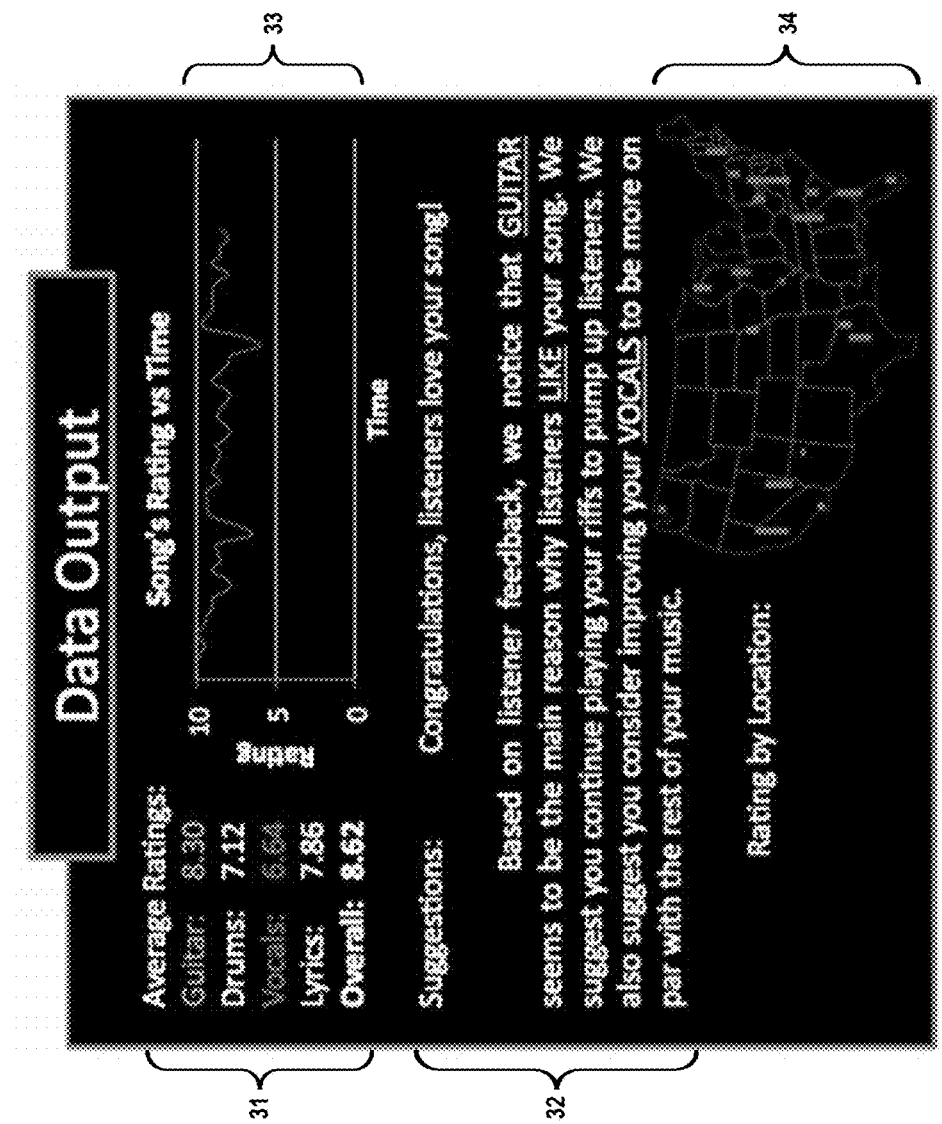
Figure 5:
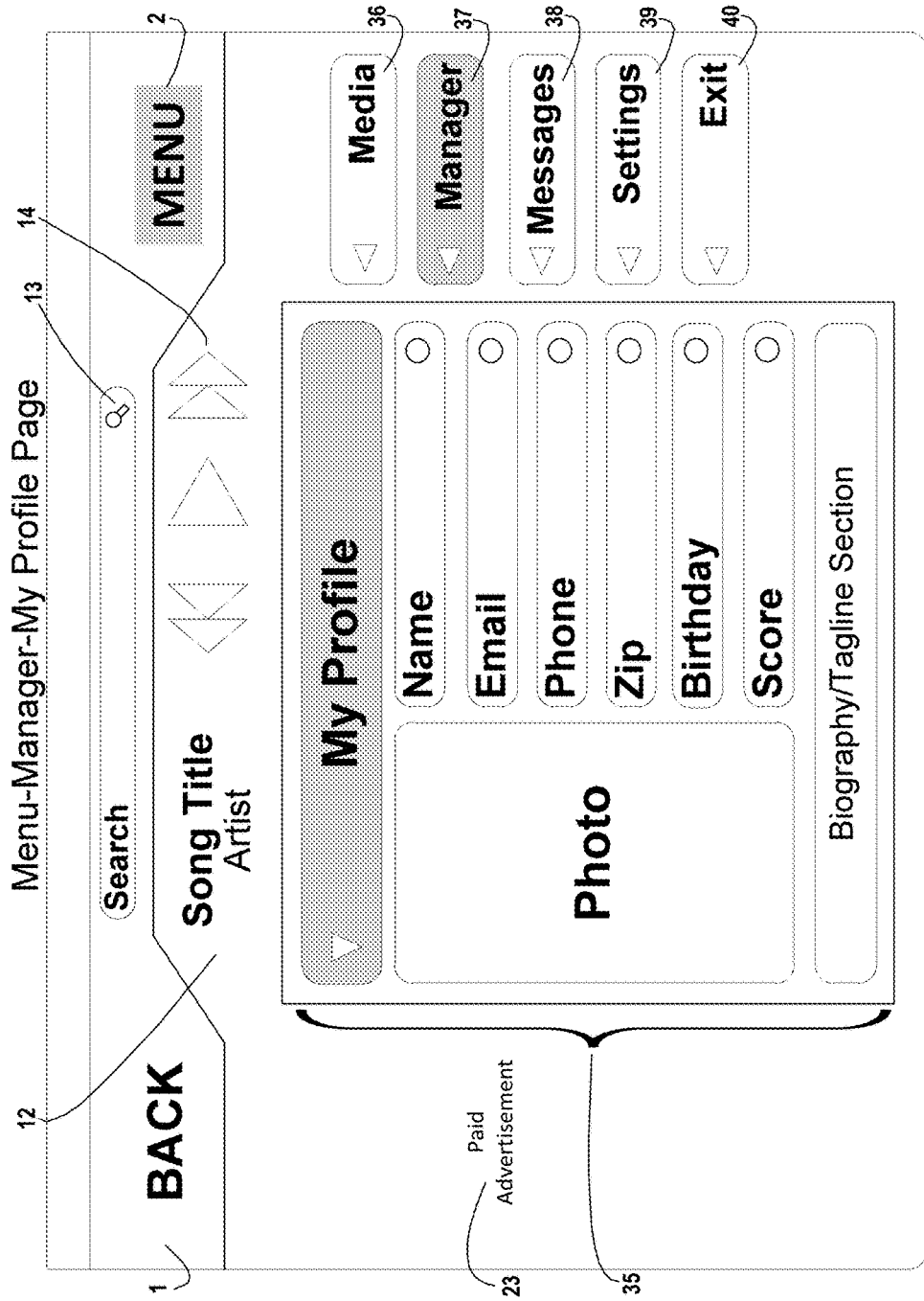
Figure 6:
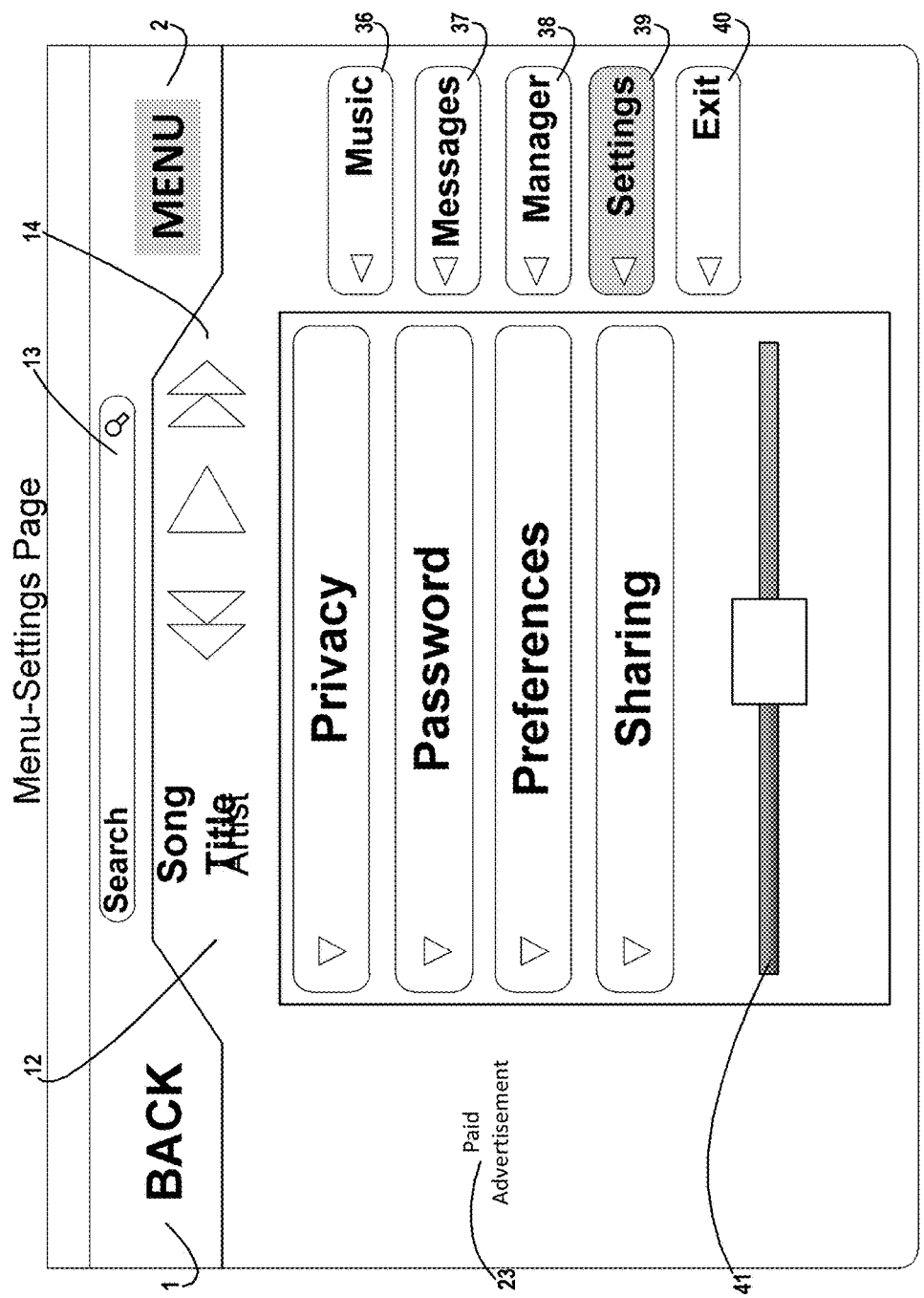
Figure 7:
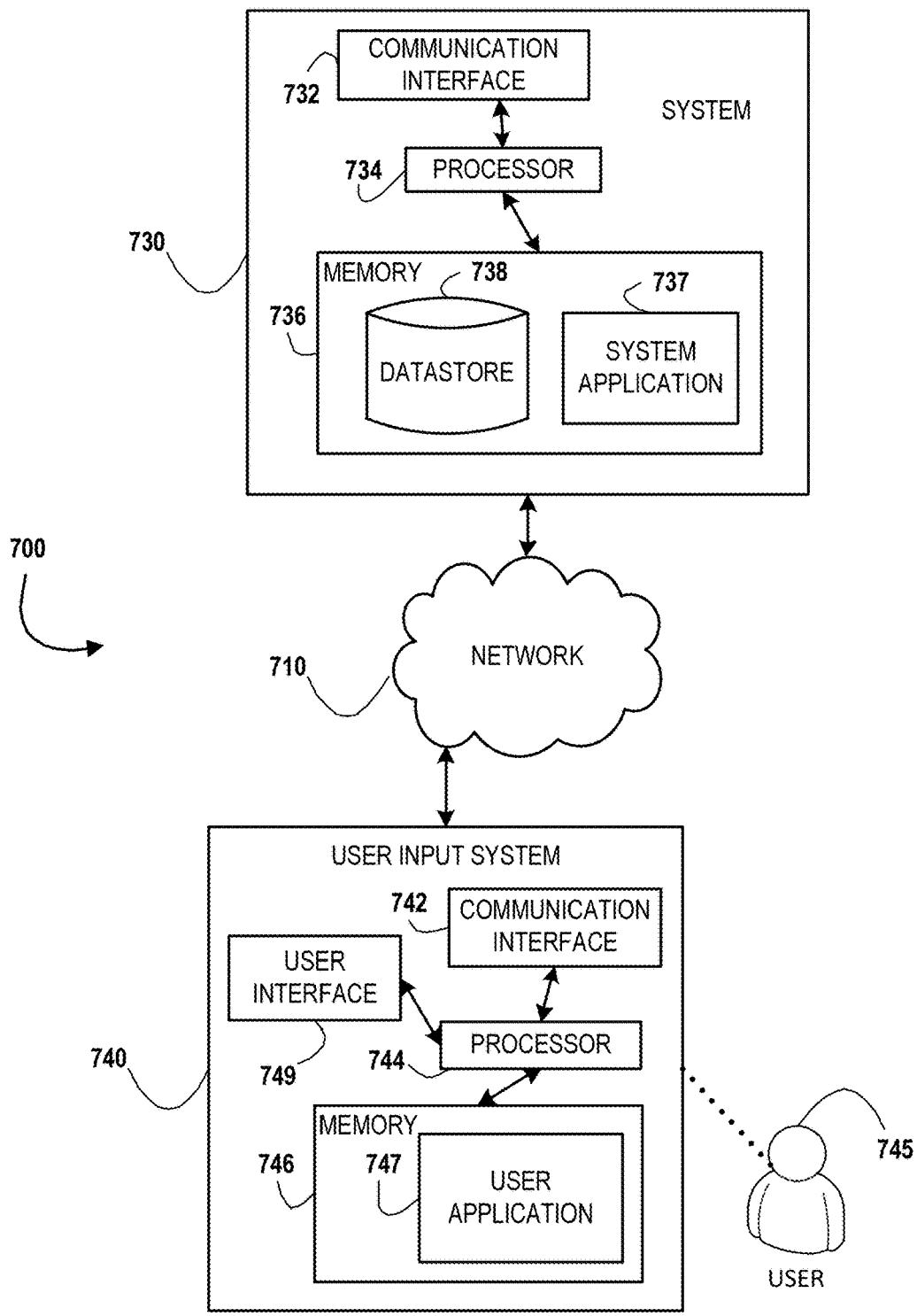
Figure 8:
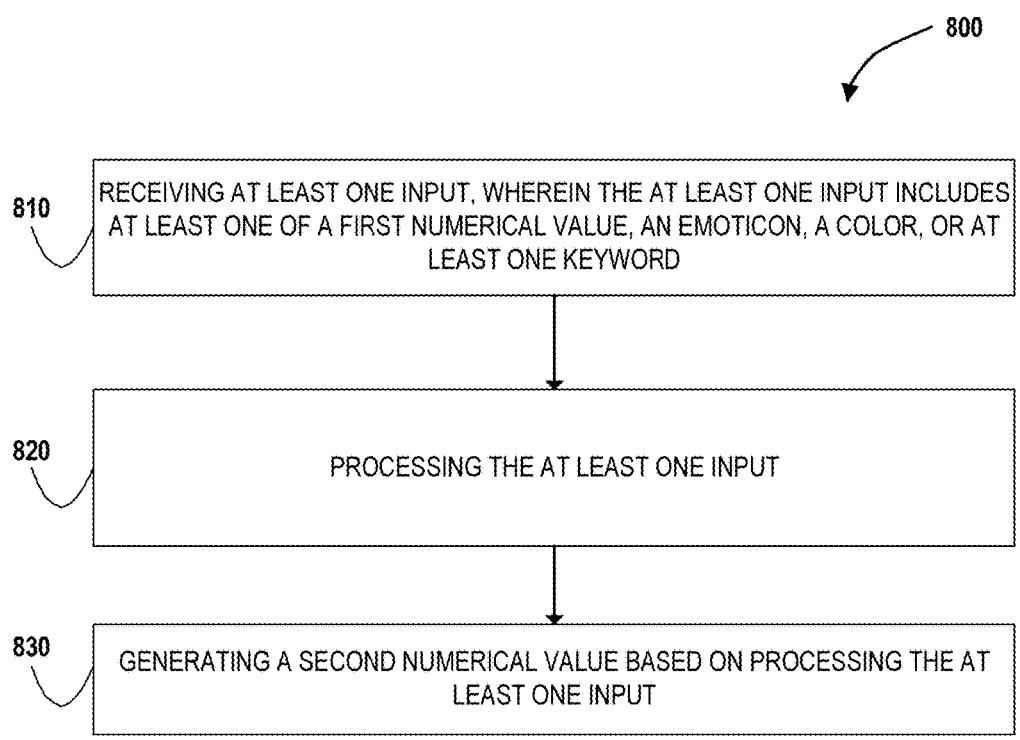

Having thus described embodiments of the invention in general terms, reference will now be made to the accompanying drawings, where:

FIG. 1 is an exemplary user interface for uploading a file to the rating system, in accordance with embodiments of the present invention;

FIG. 2 is an exemplary user interface for a home page, in accordance with embodiments of the present invention;

FIG. 3 is an exemplary user interface for rating a piece of music, in accordance with embodiments of the present invention;

FIG. 4 is an exemplary user interface for the data output, in accordance with embodiments of the present invention;

FIG. 5 is an exemplary user interface for a user profile, in accordance with embodiments of the present invention;

FIG. 6 is an exemplary user interface for user settings, in accordance with embodiments of the present invention;

FIG. 7 is an exemplary system diagram of the system, in accordance with embodiments of the present invention; and FIG. 8 is an exemplary process flow for generating a rating score based on a variety of inputs, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As used herein, a "user" may refer to a "first user," a "second user," or the like. The first user refers to an artist, a musician, a songwriter, a producer, a director, a cinematographer, a photographer, a musical performer, an engineer, a product designer, a marketer, or the like. The second user refers to an audience, a listener, an audience member, a family member, a friend, a fan, a second musician, a focus group participant, a band mate, a second songwriter, a second producer, a second director, a second musical performer, a second engineer, or the like. These user terms may be used interchangeably.

The present invention is directed to a software-based tool (e.g., an apparatus) that enables the first user to collect feedback from the second user in regards to a work of art (e.g., a piece of music, a song, an audio clip, a video, a speech, a movie, a picture, an image, a physical product, a virtual product, an item, a website, a design, a game, a book, a product demonstration, a prototype, or another type of content). The apparatus is further configured to generate a unique rating score (e.g. a numerical value) based on processing the collected feedback. The rating score serves as a numerical benchmark for comparison of multiple works of art.

The first user is enabled via an interface (e.g., a form) to upload the work of art to a server accessible by the first user and the second user. In some embodiments, the work of art is uploaded onto a dedicated server, a cloud-based server, or another storage device. In other embodiments, the first user is enabled to provide a hyperlink, a pointer, or other reference to the work of art if the work of art is already uploaded to a server. The work of art is accessible by the first user and the second user via the World Wide Web, theInternet, anapplication or operating system. The work of art may also be a physical item, and therefore uploading the work of art to a computer is not possible.

After the first user uploads or provides a link to the work of art, the first user is enabled to input information associated with the work of art. Information associated with the work of art includes a title, an artist name, a producer name, a picture or photo, a length a associated with the work of art, or the like.

The first user is also enabled to input criteria (e.g., one or more characteristics, aspects of the work of art) on which the first user wishes to receive feedback. In some embodiments, the first user is enabled to select criteria from a list of predetermined, popular, or most-used criteria. As an example, the first user selects "brightness," "contrast," "clarity," and "color" as criteria associated with a picture or video to be reviewed by the second user. In other embodiments, the first user is enabled to create custom criteria. For example, the first user inputs three instrument's names featured in a song on which he wishes to receive feedback.

The interface further enables the first user to input or select recipients (e.g., the second user) who will receive an interface that enables the recipients to respond and provide feedback. The recipients may denoted by an email address, a username, a first and/or last name, or the like and may be selected from a list of contacts or manually inputted. The first user is also enabled via the interface to input text, emoticons, or the like to provide comments or instructions to the recipients for the process of providing feedback in regards to the work of art. The message may be accessible to the general public or accessible only to a private predetermined party.

After the first user completes the form for uploading the work of art, the first user then transmits a message (e.g., a notification, alert, email, text message, or the like) to the recipients (e.g., the second user). The message includes the work of art (e.g., a video player, a music player, a picture or photograph, or the like) or a link to the work of art, an interface (e.g., a form) that enables the second user to provide feedback in regards to the work of art, and any information associated with the work of art (e.g., input criteria, comments or instructions, or the like). The message may be transmitted via a network such as the Internet, a radio network, a Bluetooth network, a fiber optic network, a wireless network, or the like. The message is accessible by the second user (or other recipients) on a mobile device, a tablet, a laptop computer, a desktop computer, a wearable computing device, or another computing device.

Once received, the second user may experience (e.g., watch, listen, look, examine, feel, touch, taste, or the like) the work of art via an interface (e.g., a form). The interface includes at least one or a combination of a video player, a music player, a media player, a photograph or picture, text, comments, instructions, a description, various input means (e.g., a slider, a button, a text field, a selection menu, or the like), information associated with the work of art, a list of rating criteria, or the like. The interface may integrate or may be integrated with a third party content provider platform.

The second user provides feedback on the work of art via the interface. In some embodiments, the second user responds to questions or instructions that the first user has designated. In other embodiments, the second user responds to the rating criteria designated by the first user. The second user interacts with a variety of input means, including but not limited to a text field, an input slider, a button, a tab, a color selection, an emoticon selection, a selection menu, a biometric input, or the like. In alternative embodiments, the second user is enabled to create and respond to custom rating criteria.

The second user is enabled to rank rating criteria based on the second user's response to each rating criterion. For example, the second user may be instructed to rank several instruments in an arrangement of a song from favorite to least favorite. This information may communicate to the first user which instrument is most critical to the song's success, which instrument needs the most improvement, or the like.

The second user is typically enabled to input at least four different types of information. First, the second user is enabled to input text or comments associated with the work of art as a whole or a specific rating criterion. Second, the second user is enabled to select a color. Third, the second user is enabled to select a numerical value associated with the work of art as a whole or a specific rating criterion. Fourth, the second user is enabled to input or select emoticons.

The inputted text or comments may provide information to the first user of what exactly the second user likes or dislikes about the work of art as a whole or a specific rating criterion. The apparatus is configured to analyze the inputted text or comments to identify, extract, and/or process keywords that are associated with particular positive, negative, or neutral emotions. For example, if the second user inputs "AWESOME!!," then the apparatus may determine that the inputted comment is positive. The apparatus compares the inputted text to a database of keywords predetermined as positive, negative, or neutral to determine if the inputted text is positive, negative, or neutral. The apparatus determines if the inputted text is positive, negative, or neutral based on determining a match between the inputted text and the stored keywords. A positive, negative, or neutral determination may respectively correlate to a numerical value. For example, a positive determination equates to +1, a negative determination equates to −1, and a neutral determination equates to 0. These determined numerical values are inputted into an equation responsible for generating a unique rating score for the work of art as a whole or a specific rating criterion. The first user, the second user, or another user (e.g., an administrator) is enabled to add, delete, or modify the list of keywords in the database.

The selected color is associated with an emotion evoked by the work of art. The second user may select the color via a color wheel, a color palette, a selection menu, or via other selection means. The apparatus is configured to determine which numerical values (red, green, and blue (RGB) values, cyan, yellow, magenta, and black values, a hexidecimal, a hue, saturation, or the like) correspond to the selected color. For example, a teal blue color may correspond to R-62, G-200, and B-228. These determined numerical values are inputted into an equation responsible for generating a unique rating score for the work of art as a whole or a specific rating criterion.

The selected numerical value may communicate how much the second user likes or dislikes the work of art as a whole or a specific criterion. The numerical value may be selected via an input slider with a range of 1-10 or via other selection means. For example, if the second user strongly likes the work of art as a whole, then he may select 10, whereas another second user that dislikes the work of art as a whole then she may select a 1. The scale may be configurable by the first user, the second user, or another user (e.g., an administrator).

The selected emoticon (e.g., a smiley face, an icon, an image, an emotion, or the like) is associated with an emotion evoked by the work of art. The second user may select the emoticon via a selection menu or via other selection means. The apparatus is configured to analyze the inputted emoticon to identify, extract, and/or process emoticons that are associated with particular positive, negative, or neutral emotions. For example, if the second user inputs a smiley face "☺" then the apparatus may determine that the inputted emoticon is positive. The apparatus compares the inputted emoticon to a database of keywords predetermined as positive, negative, or neutral to determine if the inputted emoticon is positive, negative, or neutral. The apparatus determines if the inputted emoticon is positive, negative, or neutral based on determining a match between the inputted emoticon and the stored emotions. A positive, negative, or neutral determination may respectively correlate to a numerical value. For example, a positive determination equates to +1, a negative determination equates to −1, and a neutral determination equates to 0. These determined numerical values are inputted into an equation responsible for generating a unique rating score for the work of art as a whole or a specific rating criterion. The first user, the second user, or another user (e.g., an administrator) is enabled to add, delete, or modify the list of emoticons that are able to be selected or the list of emotions in the database.

Once the second user inputs his or her response via the interface, the inputs are transmitted to the apparatus for processing. The apparatus is configured to store the inputs received from the second user in a database.

In some embodiments, processing the inputs includes analyzing the inputs. Through analysis of the inputs, the apparatus is configured to generate a wide variety of metrics associated with the work of art. For example, the apparatus may compile multiple users' inputs to produce an average rating score, an average color, an average ranking of a specific rating criterion, an average emotion or emoticon, or another metric for an audience as a whole or a specific rating criterion. In this way, the present invention enables the first user to conduct a targeted focus group for a specific audience. These metrics may be included in an apparatus-generated report.

The apparatus is configured to generate an overall rating score based on the received inputs. For example, the apparatus is configured to generate a score based on at least a numerical value associated with inputted text, a numerical rating value, a numerical value associated with an emoticon, and at least one numerical value associated with a color. The generated rating score is associated with the work of art and is assigned to the work of art upon its generation.

The apparatus is further configured to retrieve, store, track, analyze, and/or process a total number of plays, reviews, responses, the location associated with each response, or the like. The apparatus is also configured to retrieve, store, track, analyze, and/or process information associated with the first user and/or the second user (or another user). Information associated with the user includes but is not limited to location information (e.g., a zip code, global positioning system (GPS) coordinates, an IP address, or the like), contact information (e.g., an email address, a username, a phone number, a physical address, or the like), user preferences, a user history of activity, or the like. The apparatus may process the information associated with the users to generate actions, metrics, and suggestions as explained below.

The apparatus is configured to generate a report that includes a wide array of metrics associated with the feedback retrieved from the second user. The report may accessible by the first user, the second user, or the general public. The report may also be private.

The report includes an apparatus-generated optimized tour route or travel schedule based on at least received location information associated with the second user. The report includes demographic information associated with the second user. The report is generated either substantially simultaneously to generation of the rating score, or at a time after generation of the rating score.

The present invention is configured to provide the first user with at least one suggestion on how to improve the work of art. Text, an image, may be presented to the first user with creative recommendations for improving the work of art or the like. For example, if the work of art is a song and the song includes some digital clipping, the apparatus may suggest to the first user (e.g., the creator of the work of art) that they need to rerecord or reprocess the song to achieve a maximum level of audio quality. In some embodiments, a message may be generated by the apparatus and transmitted to the first user or other users. The apparatus is also configured to determine a level of perceived audio quality.

The present invention further includes a dashboard that enables the first user to manage his or her content (e.g., works of art), view and analyze metrics associated with the work of art, message recipients, upload or link the work of art, configure rating criteria, or the like.

The first user is enabled to configure the rating criteria by weighting each rating criterion individually. Weighting the rating criteria enables the first user to control the apparatus-generated overall score.

The apparatus is configured to award the first user or the second user an amount of a virtual currency (e.g., points, rewards, monetary funds, or the like). For example, the first user may be awarded points for uploading the work of art for review, and then transmitting it to a predetermined number of recipients. As another example, the second user may be awarded points for listening and providing feedback to the work of art and referring the work of art to a friend.

FIG. 1 illustrates an exemplary user interface for uploading a file and setting the rating parameters of the response system. A "Back" 1 button and a "Menu" 2 button may enable the user to navigate between pages of the interface. The first user may either upload a file (a piece of music, or the like) or provide a link to a file that has already been uploaded to the Internet. In some embodiments, the user may attach a file by selecting the "Browse" 3 button. The system may launch a window that enables the user to select a file from a storage location such as a desktop, a folder, a hard drive, or the like. In other embodiments, the user may provide a URL or a link to the file by selecting the "Enter URL" 4 button. This may allow the first user to access a file that exists online. For example, the first user may wish to link to a piece of music that has already been uploaded to the Internet, a website, a storage device (e.g. a server, a hot spot, a mobile device, or the like), a social media network, a music service, or the like. The system may print selected file or link may printed out in text underneath the "Browse" 3 button or the "Enter URL" 4 button. The apparatus may list the attached files or URLS.

Once the file to be uploaded is selected or linked, the first user may enter information 5 associated with the file. Additional notes may be entered via the "Text Entry Box" 6. In some embodiments, the system may automatically fill in at least one piece of information 5. In other embodiments, manual entry of information 5 may be utilized, or a combination of manual and automatic entry. The information 5 may include but is not limited to a title, an artist, an album, a genre, a lyric, a discography, a biography, a year, a date, a time, or the like. For applications other than a musical review, such as a movie review, a product review, a concert review, or the like, the information 5 may vary.

After entering information 5 associated with the piece of music, the first user may select at least one rating criterion by selecting at least one of the "Criterion" 7 buttons. The at least one rating criterion may be associated with an instrument in the piece of music, the mix of the piece of music, an aspect of a product, or the like. The at least one rating criterion may direct the second user to rate certain aspects of the piece of music. In some embodiments, the at least one rating criterion may be manually entered by the first user. In other embodiments, the at least one rating criterion may be automatically determined by the system. For example, the system may automatically determine which instruments are present in an arrangement of a piece of music and thus automatically include each instrument as a rating criterion. In alternative embodiments, the first user may create a custom rating criterion. This may enable the first user to select exactly on which aspect of a piece of music he wishes to receive feedback.

Once the parameters of the response system have been selected, the first user may select at least one recipient (e.g. the second user) of the response system. The first user may select the at least one recipient from a list of contacts via the "Select Contacts" 8 button, emails via the "Enter Emails" 9 button, or the like. In some embodiments, the first user may create a private party that is exclusive to the selected recipients. In other embodiments, the first user may choose to make the response system available to the public. The "Comments/Instructions" 10 box may enable the user to provide the second user with exact instructions of what is to be rated.

When the user selects the "Upload & Send" 11 button, the system may upload the file to a server, a database, or the like. The system may automatically create a table and enter into the table the information 5 associated with the file. The system may then transmit the response system's user interface to a device (mobile device, computer, laptop, tablet, or the like) associated with the selected recipients (e.g. the second user) via an internal messaging system, an email, a text message, a social media post, an SMS message, a notification, or the like.

This transmittal process may also be accomplished in other ways without the "Upload & Send" 11 button. For example, the upload process and the transmittal process may utilize an attachment button and/or a send button in an email application, a messaging system, on a website, over a network such as the Internet, or the like.

FIG. 2 illustrates an exemplary user interface for the Home Page of the response system. The response system may enable the first user and/or the second user to listen, share, and interact with a piece of music. The information 5 associated with a piece of music may be displayed in a banner 12. Selecting the banner 12 may display a more detailed report of a musician's profile. A search bar 13 may enable the first user and/or the second user to quickly find a piece of music, an album, a musician, information, or the like. Player controls 14 may provide the first user and/or the second user with control over which piece of music is playing.

The first user and/or the second user may add a piece of music to a playlist, an album or the like via the "Add" 15 button. The first user and/or the second user may rate a piece of music by selecting the "Rate" 16 button. The first user and/or the second user may share a piece of music on a social networking site, a text message, an email, an SMS message, or the like via the "Share" 17 button. The first user and/or the second user may learn more information about the piece of music by selecting the "Info" 18 button. A seek bar 19, a shuffle feature 20, and a loop feature 21 may provide the first user and/or the second user with further control of their listening experiences. An album art image 22 may be displayed. Selecting the album art image 22 may enable a zooming feature. A paid advertisement 23 and a random advertisement 24 may be featured throughout the interfaces.

While a piece of music is playing, the second user may select the "Rate" 16 button from the Home Page to make note of what he likes or dislikes in the piece of music. When the "Rate" 16 button is selected as depicted in FIG. 3, the system may store the point in time with a timestamp, a date, a time, or the like at which the "Rate" 16 button was selected. This enables the system to inform the first user exactly when something caught the second user's attention in the piece of music.

FIG. 3 illustrates an exemplary user interface for rating a piece of music using the response system. The exemplary user interface depicted in FIG. 3 may be transmitted to the second user's device when he selects the "Rate" 16 button from the Home Page. In other embodiments, the user interface for rating a piece of music may be embedded in an email, on a webpage, or the like. In some embodiments, the second user may not utilize the "Rate" 16 button to evaluate an aspect of the piece of music.

When rating the piece of music, the user may select the rating criterion that he wishes to evaluate by selecting the "Rating Criterion" 25 button. The rating criterion may include an instrument name, a mix, an aspect of the piece of music, a custom rating criterion, an aspect of a product, or the like. The rating criteria may be selected from a list or a menu of icons, text, images, or the like. In some embodiments, the second user may create his own rating criterion that he wishes to evaluate. The user may learn more about the selected rating criterion and its associated rating scale by selecting the "i" 26 button.

Once the rating criterion is selected, the second user may select a rating score to associate with the selected rating criterion. The rating score may be selected using a rating slider 27, a text entry field, a menu, a list, or the like. The rating slider 27 may define a scale determined by the rating criterion and disclosed through the "i" 26 button.

For example, the scale of the rating slider 27 may include a range of at least one numerical value, qualitative value, or the like. The scale may operate along a numerical value range from 0 to 10. From this scale and using the rating slider 27, the second user may select a rating score of 7.8 because he liked the selected rating criterion at a specific point in time. The system may automatically associate the selected rating score with the selected rating criterion. The purpose of the rating score is to quantify how much the second user likes or dislikes a certain aspect of a piece of music.

Next, the second user may associate a color with the rating criterion via a color slider 28. Associating a color with an aspect of a piece of music may help the second user express how the aspect of a piece of music makes him feel at a specific point in time. The first user in turn may receive this information and thus be able to determine a second user's emotional response that is elicited by a piece of music.

Each color determined by the color slider 28 may correspond to at least one RGB (red-green-blue) value, CMYK (cyan-magenta-yellow-black) value, or similar color value. The at least one RGB or CMYK value may be associated with a numerical value. For example, the color red's RGB value is 255, 0, 0 respectively. Another example is teal's CMYK value of 100, 0, 0, 50 respectively. In other embodiments, the color values may be associated with a HEX number, HTML, CSS, similar computer languages, or the like. Additionally, the second user may also input notes via the "Notes" 29 button. The second user's notes may be text, a keyword, an image, an emoticon, or the like.

When the second user is done evaluating the piece of music, he may select the "Done" 30 button. Selecting the "Done" 30 button may enable the system to transmit the information associated with the second user's opinion (the rating criterion, the rating score, the at least one color value, the notes, or the like) from the second user's device to the system's server, a database, or the like. The second user may be rewarded with a virtual currency, points, or the like for submitting his opinion via the response system.

The system may store the received information in a database, a mainframe, a datastore, a table, or the like. In some embodiments, the system may transmit the information associated with the second user's opinion substantially simultaneously to the receipt of the information. In other embodiments, the system may further process the information.

The system may process the selected rating score, the at least one color value associated with the selected color, the second user's notes, and/or a combination of the aforementioned by inputting them into an algorithm. The at least one color value may be used to weight the rating score. For example, if the user inputs a guitar's rating score of 7.8, a color of red, a smiley face in the notes, and enters the keywords "love" and "guitar" in the notes, the system may increase the 7.8 to an 8.0 based on the additional positive inputs. Different combinations of color values, emoticons, keywords, or the like may have different effects on the rating value. In some embodiments, the rating score, the at least one color value, and the notes may be processed according to a logarithmic scale. In other embodiments, the rating score, the at least one color value, and the notes may be processed according to a linear regression model. In alternative embodiments, the rating score, the at least one color value, and the notes may be processed in another mathematical way.

In an alternative embodiment, the system may collect the second user's rating score at a predetermined time interval. For example, the system may sample the corresponding numerical value of the rating slider 27 every second, every five seconds, when the second user makes a change, or the like. This may enable the second user to slide the rating slider 27 (and thus communicate the rating score) as the piece of music plays in real time. In some embodiments, the collected rating score may be transmitted to the system's server, database, the first user, or the like substantially simultaneously to the time of each sampling. In other embodiments, the collected rating score may be transmitted to the system's server, database, the first user, or the like at a later predetermined time.

The system may transmit the processed information to the first user for viewing and/or further analysis. Included in the analysis may be a calculation of an overall rating score for each rating criterion or the piece of music as a whole 31. These overall rating scores may be calculated via an average, a linear regression, a logarithmic function, or another mathematical process.

FIG. 4 depicts exemplary results of the response system. Based the analysis of the received information associated with the second user's opinion (including the rating score, the at least one color value, the notes, or the like), the system may automatically provide suggestions 32 on how to improve certain aspects of the piece of music, as depicted in FIG. 4. The system may also identify which aspects of a piece of music are critical to its overall rating score. Alternatively, the system may analyze the received information to project a probability of commercial success of a piece of music. These suggestions and projections may be transmitted to the first user for viewing and review, wherein a graph 33 shows the peaks and valleys associated with where the piece of music was liked or disliked, and by how much. The drawn line corresponds to the value of the rating score at each point in time, and the line color is associated with the selected color. Both overall graphs and scores and individual graphs and scores may be viewed.

FIG. 4 also includes a map of at least one second user's demographic information (a name, a username, an age, a zip code, an email address, or the like). The at least one second user may be incentivized with virtual currency, points, or a similar reward to share their demographic information. An analysis of the at least one second user's demographic information may enable the system to determine an optimal touring route for the first user. The audience demographic information may be sorted or viewed by the first user.

Other pieces of information that are transmitted by the system to the first user may include but is not limited to the point in time when a listener pressed "Next" or skipped the user's song, a total number of plays, a total number of favorites, a total number of playlist adds, a total number of page views, a total number of shares, a total number of rates, a total number of fans, a predictability score of success, a point value, an overall score, a virtual currency value, or the like. The system may be configured to capture, store, transmit, or display at least one of the aforementioned pieces of information.

The system may be configured to determine the overall color of an image associated with an album cover. The system may analyze the album cover image by receiving its color values in a similar method as the one described above and determining an average, a majority, or similar assumption to identify and associate a color label with the album cover image. In some embodiments, the system may identify the color of the album cover image by determining the at least one color value associated with each pixel. In other embodiments, another method may be used.

FIG. 5 depicts an exemplary user profile page. The system may be configured to enable the first user and/or the second user to create a profile wherein the profile contains information 35 (demographic information, an image, contact information, or the like). At least one piece or a combination of this information may be analyzed by the system to help the first user understand the second user. The system may support manual and/or automatic entry of this information.

A "Menu" 2 button may be included throughout the interface that may allow for easy navigation. Included in the "Menu" 2 button may be a "Media" 36 button that allows the first user and/or the second user to select a piece of music, a video clip, or the like. A "Manager" 37 button may enable the first and/or the second user to manage his profile, uploaded media, or the like. A "Messages" 38 button may provide access to the system's internal messaging system. A "Settings" 39 button may allow changes to be made to preferences, privacy, or the like. An "Exit" 40 button may close the program.

As seen in FIG. 6, the system may enable the first user and/or the second user to set preferences, settings, or the like. Also, the first user and/or the second user may be enabled to define a color via a color preference slider. Based on an analysis of the at least one color value associated with the defined color preference, the system may suggest a next piece of music, a playlist, an advertisement, or the like based on the user's selected color. In some embodiments, the analysis may operate similarly to the aforementioned method of extracting the at least one color value from the selected color. In other embodiments, the analysis may operate differently to the aforementioned method of extracting the at least one color value from the selected color. The system may award virtual currency, points, or the like to the first user and/or the second user based on how often the first user and/or the second user changes or modifies the color.

In some embodiments, the rating score may be collected and processed by the system. In other embodiments, the at least one color value may be collected and processed by the system. In yet other embodiments, the keyword or emoticon may be collected and processed by the system. In alternative embodiments, a combination of the rating score, the at least one color value, keyword, and/or emoticon may be collected and processed by the system.

FIG. 7 presents an exemplary block diagram of the system environment 700 for implementing the present invention and the process flow 800 in FIG. 8. As illustrated, the system environment 700 includes a network 710, a system 730, and a user input system 740. Also shown in FIG. 7 is a user 745 of the user input system 740. The user input system 740 may be a mobile device described herein. The user 745 may be a person who uses the user input system 740 to execute a user application 747. The user application 747 may be an application to communicate with the system 730, perform a transaction, input information onto a user interface presented on the user input system 740, or the like. The user application 747 and/or the system application 737 may incorporate one or more parts of any process flow described herein.

As shown in FIG. 7, the system 730, and the user input system 740 are each operatively and selectively connected to the network 710, which may include one or more separate networks. In addition, the network 710 may include a telecommunication network, local area network (LAN), a wide area network (WAN), and/or a global area network (GAN), such as the Internet. It will also be understood that the network 710 may be secure and/or unsecure and may also include wireless and/or wireline and/or optical interconnection technology.

The user input system 740 may include any computerized apparatus that can be configured to perform any one or more of the functions of the user input system 740 described and/or contemplated herein. For example, the user 745 may use the user input system 740 to transmit and/or receive information or commands to and from the system 730. In some embodiments, for example, the user input system 740 may include a personal computer system (e.g. a non-mobile or non-portable computing system, a motor vehicle, or the like), a mobile computing device, a personal digital assistant, a mobile phone, a tablet computing device, a network device, and/or the like. As illustrated in FIG. 7, in accordance with some embodiments of the present invention, the user input system 740 includes a communication interface 742, a processor 744, a memory 746 having an user application 747 stored therein, and a user interface 749. In such embodiments, the communication interface 742 is operatively and selectively connected to the processor 744, which is operatively and selectively connected to the user interface 749 and the memory 746. In some embodiments, the user 745 may use the user application 747 to execute processes described with respect to the process flows described herein.

Each communication interface described herein, including the communication interface 742, generally includes hardware, and, in some instances, software, that enables the user input system 740, to transport, send, receive, and/or otherwise communicate information to and/or from the communication interface of one or more other systems on the network 710. For example, the communication interface 742 of the user input system 740 may include a wireless transceiver, modem, server, electrical connection, and/or other electronic device that operatively connects the user input system 740 to another system such as the system 730. The wireless transceiver may include a radio circuit to enable wireless transmission and reception of information. Additionally, the user input system 740 may include a positioning system. The positioning system (e.g. a global positioning system (GPS), a network address (IP address) positioning system, a positioning system based on the nearest cell tower location, or the like) may enable at least one of the user input system 740 or an external server or computing device in communication with the user input system 740 to determine the location (e.g. location coordinates) of the user input system 740.

Each processor described herein, including the processor 744, generally includes circuitry for implementing the audio, visual, and/or logic functions of the user input system 740. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 747 of the memory 746 of the user input system 740.

Each memory device described herein, including the memory 746 for storing the user application 747 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 7, the memory 746 includes the user application 747. In some embodiments, the user application 747 includes an interface for communicating with, navigating, controlling, configuring, and/or using the user input system 740. In some embodiments, the user application 747 includes computer-executable program code portions for instructing the processor 744 to perform one or more of the functions of the user application 747 described and/or contemplated herein. In some embodiments, the user application 747 may include and/or use one or more network and/or system communication protocols.

Also shown in FIG. 7 is the user interface 749. In some embodiments, the user interface 749 includes one or more output devices, such as a display and/or speaker, for presenting information to the user 745. In some embodiments, the user interface 749 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 745. In some embodiments, the user interface 749 includes the input and display devices of a mobile device, which are operable to receive and display information.

FIG. 7 also illustrates a system 730, in accordance with an embodiment of the present invention. The system 730 may refer to the "apparatus" described herein. The system 730 may include any computerized apparatus that can be configured to perform any one or more of the functions of the system 730 described and/or contemplated herein. In accordance with some embodiments, for example, the system 730 may include a computer network, an engine, a platform, a server, a database system, a front end system, a back end system, a personal computer system, and/or the like. In some embodiments, such as the one illustrated in FIG. 7, the system 730 includes a communication interface 732, a processor 734, and a memory 736, which includes a system application 737 and a datastore 738 stored therein. As shown, the communication interface 732 is operatively and selectively connected to the processor 734, which is operatively and selectively connected to the memory 736.

It will be understood that the system application 737 may be configured to implement any one or more portions of the various user interfaces and/or process flow described herein. The system application 737 may interact with the user application 747. It will also be understood that, in some embodiments, the memory includes other applications. It will also be understood that, in some embodiments, the system application 737 is configured to communicate with the datastore 738, the user input system 740, or the like.

It will be further understood that, in some embodiments, the system application 737 includes computer-executable program code portions for instructing the processor 734 to perform any one or more of the functions of the system application 737 described and/or contemplated herein. In some embodiments, the system application 737 may include and/or use one or more network and/or system communication protocols.

In addition to the system application 737, the memory 736 also includes the datastore 738. As used herein, the datastore 738 may be one or more distinct and/or remote datastores. In some embodiments, the datastore 738 is not located within the system and is instead located remotely from the system. In some embodiments, the datastore 738 stores information or data described herein. For example, the datastore 738 may store information associated with the user's account.

It will be understood that the datastore 738 may include any one or more storage devices, including, but not limited to, datastores, databases, and/or any of the other storage devices typically associated with a computer system. It will also be understood that the datastore 738 may store information in any known way, such as, for example, by using one or more computer codes and/or languages, alphanumeric character strings, data sets, figures, tables, charts, links, documents, and/or the like. Further, in some embodiments, the datastore 738 may include information associated with one or more applications, such as, for example, the system application 737. It will also be understood that, in some embodiments, the datastore 738 provides a substantially real-time representation of the information stored therein, so that, for example, when the processor 734 accesses the datastore 738, the information stored therein is current or substantially current.

It will be understood that the embodiment of the system environment illustrated in FIG. 7 is exemplary and that other embodiments may vary. As another example, in some embodiments, the system 730 includes more, less, or different components. As another example, in some embodiments, some or all of the portions of the system environment 700 may be combined into a single portion. Likewise, in some embodiments, some or all of the portions of the system 730 may be separated into two or more distinct portions.

In addition, the various portions of the system environment 700 may be maintained for and/or by the same or separate parties. It will also be understood that the system 730 may include and/or implement any embodiment of the present invention described and/or contemplated herein. For example, in some embodiments, the system 730 is configured to implement any one or more of the embodiments of the process flows described and/or contemplated herein in connection any process flow described herein. Additionally, the system 730 or the user input system 740 is configured to initiate presentation of any of the user interfaces described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

FIG. 8 illustrates an exemplary process flow 800 for generating a rating score based on a variety of inputs. At block 810, the process includes receiving at least one input, wherein the at least one input comprises at least one of a first numerical value, an emoticon, a color, or at least one keyword. At block 820, the process includes processing the at least one input. At block 830, the process includes generating a second numerical value based on processing the at least one input.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method comprising:
providing a user interface at a user device, wherein the user interface enables a user to control playback of audio content provided by a media content server, and wherein the user interface comprises a plurality of selectable portions, each selectable portion being associated with a different instrument track comprised in the audio content;
receiving, by the user interface, user input from the user during playback of the audio content, wherein the user input comprises a selection of one of the selectable portions at a point in time during playback;
transforming, by a processor of the user device, the user input into transformed user input, wherein the transformed user input comprises a value associated with the selection and a timestamp associated with the point in time during playback at which the selection was received; and
transmitting, by a communication interface of the user device, the transformed user input to a database not comprised in the user device for storage, wherein the transformed user input is associated with the audio content in the database, and wherein the transformed user input is transmitted to the database substantially simultaneously to receiving the user input, and wherein the user input is transformed into the transformed user input based on:
comparing the received user input and a plurality of predetermined user inputs stored in a second database comprised in the user device;
determining a match between the received user input and a first predetermined user input comprised in the plurality of predetermined user inputs; and
identifying the value, wherein the value is associated with the first predetermined user input in the second database.

2. The method of claim 1, wherein each instrument track is associated with a different instrument comprised in a musical arrangement of the audio content.

3. The method of claim 1, wherein the selection indicates that the associated instrument track caught the user's ear.

4. The method of claim 1, wherein the transformed user input is transmitted to the database at a predetermined time.

5. The method of claim 1, wherein the transformed user input is used for at least one of:
identifying, by a computing processor, an instrument track comprised in the audio content that is most favoured; and
identifying, by a computing processor, an instrument track comprised in the audio content that is least favoured.

6. The method of claim 1, wherein the audio content is provided to the user in response to:
receiving, by the communication interface of the user device, a request to provide the user input, wherein the request comprises the user interface.

7. The method of claim 1, wherein the user is awarded an amount of virtual currency in response to at least one of:
initiating playback of the audio content at the user device;
receiving the user input;
receiving demographic information associated with the user;
sharing the audio content on a social media network;

transmitting the transformed user input to the database; and storing the transformed user input in the database.

8. The method of claim 7, wherein an amount of virtual currency is awarded to a second user in response to at least one of:

the second user uploading the audio content to the media content server; and transmitting the audio content from the media content server to the user device.

9. The method of claim 1, wherein the transformed user input is used for generating, by a computing processor, a recommendation for improving at least one instrument track comprised in the audio content.

10. The method of claim 1, wherein the user input comprises at least one of a user selection of a selectable portion, a button, a tab, a slider, an icon, an emoticon, a numerical value, or a color, text, a numerical value, a color value, sensor data, and biometric data.

11. The method of claim 1, wherein the transformed user input is used for generating, by a computing processor, a ranked order of at least two instrument tracks comprised in the audio content.

12. The method of claim 1, wherein a name of the instrument track is defined by a second user prior to the audio content being provided to the user device.

13. The method of claim 1, wherein a name of the instrument track is defined by the user when the user provides the user input at the user device.

14. The method of claim 1, wherein one or more instrument tracks comprised in the first audio content are identified by a computing processor based on an analysis of the audio content.

15. The method of claim 1, wherein the transformed user input is used for generating, by a computing processor, a graph of user input received during playback of the audio content, wherein the graph includes an indication of the selection being received at the point in time during playback.

16. The method of claim 1, wherein the transformed user input is used for determining, by a computing processor, second audio content to be provided to the user.

17. A user device comprising:

at least one memory comprising instructions; and at least one processing device configured for executing the instructions, wherein executing the instructions causes the at least one processing device to perform the operations of:

providing a user interface at the user device, wherein the user interface enables a user to control playback of audio content provided by a media content server, and wherein the user interface comprises a plurality of selectable portions, each selectable portion being associated with a different instrument track comprised in the audio content;

receiving, by the user interface, user input from the user during playback of the audio content, wherein the user input comprises a selection of one of the selectable portions at a point in time during playback;

transforming, by a processor of the user device, the user input into transformed user input, wherein the transformed user input comprises a value associated with the selection and a timestamp associated with the point in time during playback at which the user input was received; and transmitting, by a communication interface of the user device, the transformed user input to a database not comprised in the user device for storage, wherein the transformed user input is associated with the audio content in the database, and wherein the transformed user input is transmitted to the database substantially simultaneously to receiving the user input, and wherein the user input is transformed into the transformed user input based on:

comparing the received user input and a plurality of predetermined user inputs stored in a second database comprised in the user device;

determining a match between the received user input and a first predetermined user input comprised in the plurality of predetermined user inputs; and identifying the value, wherein the value is associated with the first predetermined user input in the second database.

18. A non-transitory computer readable medium of a user device comprising code, wherein the code, when executed by at least one processing device of the user device, causes the at least one processing device to perform the operations of:

providing a user interface at the user device, wherein the user interface enables a user to control playback of audio content provided by a media content server, and wherein the user interface comprises a plurality of selectable portions, each selectable portion being associated with a different instrument track comprised in the audio content;

receiving, by the user interface, user input from the user during playback of the audio content, wherein the user input comprises a selection of one of the selectable portions at a point in time during playback;

transforming, by a processor of the user device, the user input into transformed user input, wherein the transformed user input comprises a value associated with the selection and a timestamp associated with the point in time during playback at which the user input was received; and transmitting, by a communication interface of the user device, transformed user input to a database not comprised in the user device for storage, wherein the transformed user input is associated with the audio content in the database, and wherein the transformed user input is transmitted to the database substantially simultaneously to receiving the user input, and wherein the user input is transformed into the transformed user input based on:

comparing the received user input and a plurality of predetermined user inputs stored in a second database comprised in the user device;

determining a match between the received user input and a first predetermined user input comprised in the plurality of predetermined user inputs; and identifying the value, wherein the value is associated with the first predetermined user input in the second database.

* * * * *